United States Patent
Contoli et al.

(10) Patent No.: US 7,926,645 B2
(45) Date of Patent: Apr. 19, 2011

(54) AIR CONVEYOR

(75) Inventors: Piercarlo Contoli, Faenza (IT); Andrea Sallioni, Molinella (IT); Paolo Marchi, Imola (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 0 days.

(21) Appl. No.: 12/304,830

(22) PCT Filed: May 28, 2007

(86) PCT No.: PCT/EP2007/055137
§ 371 (c)(1),
(2), (4) Date: Apr. 20, 2009

(87) PCT Pub. No.: WO2007/144257
PCT Pub. Date: Dec. 21, 2007

(65) Prior Publication Data
US 2009/0205931 A1      Aug. 20, 2009

(30) Foreign Application Priority Data

Jun. 16, 2006   (EP) .................................... 06115611
Apr. 4, 2007    (IT) ............................. MO2007A0123

(51) Int. Cl.
*B65G 19/30* (2006.01)
(52) U.S. Cl. ...................................... 198/721; 198/727
(58) Field of Classification Search ................. 198/493, 198/721, 727, 728
See application file for complete search history.

(56) References Cited

U.S. PATENT DOCUMENTS

| 4,170,290 | A | * | 10/1979 | Frisbie et al. | ................. | 198/728 |
| 5,180,049 | A | * | 1/1993 | Salvagnini | ..................... | 198/721 |
| 5,823,318 | A | * | 10/1998 | Baur et al. | ..................... | 198/726 |
| 5,950,804 | A | * | 9/1999 | Farkas | .......................... | 198/726 |
| 5,984,591 | A |   | 11/1999 | Hilbish et al. |  |  |
| 7,428,961 | B2 | * | 9/2008 | Temming et al. | ............. | 198/723 |

FOREIGN PATENT DOCUMENTS

WO    WO 02/06143    1/2002

OTHER PUBLICATIONS

International Search Report for PCT/EP2007/055137, mailed Sep. 10, 2007.
International Preliminary Report on Patentability for PCT/EP2007/055137, dated Oct. 8, 2008.

* cited by examiner

*Primary Examiner* — James R Bidwell
(74) *Attorney, Agent, or Firm* — Nixon & Vanderhye P.C.

(57) ABSTRACT

An apparatus comprises a conveying element arranged for conveying objects, an advancing promoting arrangement for promoting a movement of the objects along the conveying element, the advancing promoting arrangement comprising a bristle arrangement arranged along the conveying element and suitable for interacting with the objects; an apparatus for conveying objects comprises a conveying plane element arranged for supporting the objects and a blowing arrangement arranged for advancing the objects in an advance direction, the conveying plane element being selected from a group comprising a rolling arrangement, a fluid cushion arrangement.

22 Claims, 8 Drawing Sheets

AIR CONVEYOR

CROSS-REFERENCE TO RELATED APPLICATIONS

This application is the U.S. national phase of International Application No. PCT/EP2007/055137, filed 28 May 2007, which designated the U.S. and claims priority to Europe Application No. 06115611.3, filed 16 Jun. 2006; and Italy Application No. MO2007A000123, filed 4 Apr. 2007, the entire contents of each application is hereby incorporated by reference.

DESCRIPTION

The invention relates to apparatuses for conveying objects, in particular for conveying caps that are obtained for example by moulding plastics, or by forming metal sheets.

An apparatus for conveying caps is known, comprising a U-shaped conveying element, along which the caps are conveyed. The caps are transferred, for example, from a forming station to a subsequent operating station.

The conveying element is shaped in such a way as to advance the caps in a single row.

The conveying element comprises two guide side walls facing one another and projecting transversely from edge portions of a bottom wall.

A supporting wall is provided for supporting the caps. The supporting wall extends transversely between the two guide side walls and is arranged parallel to the bottom wall.

The caps slide on the supporting wall and are guided by the guide side walls.

The supporting wall is arranged in such a way as to separate a top region, through which the caps are conveyed, and a bottom region that is partially delimited by the bottom wall and by portions of the side walls. An air flow, generated for example by a fan, passes through the bottom region to interact with the caps.

The caps are so arranged that an end wall thereof abuts on the supporting wall. On the supporting wall, or on a cover of the conveying element, openings or nozzles are provided that are distributed along the advance direction for the caps. Air flowing through the openings, or pressurised air supplied by the nozzles, is directed to the caps so as to push the latter along the advance direction.

In particular, on the supporting wall, triangular openings are obtained through which the air flows, coming from the bottom region, reaches the top region and interacts with the caps.

The triangular openings are uniformly distributed along the advance direction along which the caps are advanced so that adjacent triangular openings are separated by a preset distance. Deflecting portions associated with the triangular openings project from a bottom side of the supporting wall that is opposite a top side of the supporting wall interacting with the caps.

Each deflecting portion directs part of the air flow towards the caps so as to reduce friction between the caps and the top side of the supporting wall and to move the caps along the advance direction.

The air is compressed and subsequently supplied by means of a suitable compressing device.

A drawback of the aforementioned apparatus is that it does not advance the caps in an effective manner.

In particular, undesired sticking of the caps may occur when the caps interact with the regions of the support wall that are comprised between two adjacent triangular openings, thus slowing down the conveying operation of the caps. The slowing-down of the conveying operation is even more evident when the caps have just been formed, because they are still hot and thus tend to adhere to the surfaces of the channel element.

Furthermore, due to sliding of the caps relative to the supporting wall and to the guide side walls, friction generates that may damage the caps, especially if the caps have just been formed and thus tend to adhere to the conveying element. Furthermore, a high pressure of the air is required for advancing the caps, that generates a high noisiness and make any dust raise near the apparatus.

A compressing device is further required to generate a high air pressure, that is rather expensive and that also implies a high power consumption.

EP 1305243 discloses a device for controlled conveying of products (2), such as drinks cans or bottles, from an intake (3) at a first height level to an outlet (5) at a second height level. The device comprises a substantially vertical conveyor duct (4) which is arranged to contain a plurality of axially stacked products (2) and which forms a transport path from the intake (3) to the outlet (5), a sensor device, arranged to provide a signal expressing that a product has been removed from the outlet (5), conveyor devices, arranged to perform a repeatable convey cycle for controlled conveying of a product to the outlet, and a control device, arranged to implement the convey cycle on the basis of the said signal. In one embodiment, the conveyor duct (4) is provided with friction means (30), which comprises a set of brushes or a brush-like layer. The friction means (30) acts as a retaining means in order to prevent a product (2) from falling down through the conveyor duct (4).

An object of the invention is to improve known apparatuses for conveying caps.

A further object of the invention is to provide an apparatus that is able to convey objects, in particular caps, in a fluent and fast manner and that reduces undesired sticking during advancing of the objects.

Another object of the invention is to provide an apparatus that is able to convey caps so as to limit the risk that the latter be damaged, in particular by reducing the friction to which the caps are subject during conveying.

A further object of the invention is to provide an apparatus for conveying caps that is able to operate with reduced noisiness.

A further object of the invention is to provide an apparatus having a limited cost that is able to operate with reduced power consumption compared with the known apparatuses.

According to the invention, there is provided an apparatus as defined in claim 1. Owing to the invention, it is possible to provide an apparatus that is able to reduce the friction that generates between the objects and the conveying element. In particular, the bristle arrangement enables extent of the contact zones between the objects and the apparatus to be considerably reduced.

This enables wear and damaging of the objects to be reduced during advancing. The bristle arrangement comprises a movable advancing bristle arrangement that is able to advance the objects even without using air jets, or with the aid of air jets whose pressure is considerably reduced with respect to the known apparatuses, owing to reduction of friction provided by the bristle arrangement.

In this way an apparatus is obtained that is able to operate with a limited noisiness, thus improving the working conditions in the proximity of the apparatus. Furthermore, since no powerful devices are required for compressing the air, an apparatus is obtained having a reduced cost and that is able to operate with low power consumption.

According to a second aspect of the invention, there is provided an apparatus for conveying objects, comprising a conveying plane element arranged for supporting said objects and a blowing arrangement arranged for advancing said objects in an advance direction, wherein said conveying plane element is selected from a group comprising a rolling arrangement, a fluid cushion arrangement.

Owing to the second aspect of the invention, there is provided an apparatus that improves advancing of objects, such as caps, thus preventing the objects from sticking during advancing on the conveying plane element. In particular, a rolling arrangement, with which an embodiment of the apparatus is provided, is able to transform sliding friction between the caps and the conveying plane element of the prior art apparatuses into rolling friction, thus enabling the caps to be advanced easily in the advance direction.

A fluid cushion arrangement, with which another embodiment of the apparatus is provided, occupies substantially the whole conveying plane element and provides an upward pushing action that considerably reduces sliding friction between the caps and the conveying plane element of the prior art apparatuses, thus enabling the caps to be advanced easily in the advance direction.

The invention may be better understood and carried out with reference to the enclosed drawings that show some embodiments thereof by way of non-limitative example, wherein:

FIGS. 1 to 8 show an apparatus 1 for conveying objects, in particular caps 2, along an advance direction A.

The caps may be obtained by moulding plastics (for example by injection moulding or by compression moulding), or by forming metal sheets.

In particular the caps may be screw caps made of plastics, or crown caps made of metal.

The apparatus 1 is provided with a conveying element comprising a supporting frame 3, provided with a conveying channel 22 along which the caps 2 are conveyed.

Figures 1, 2, 3:
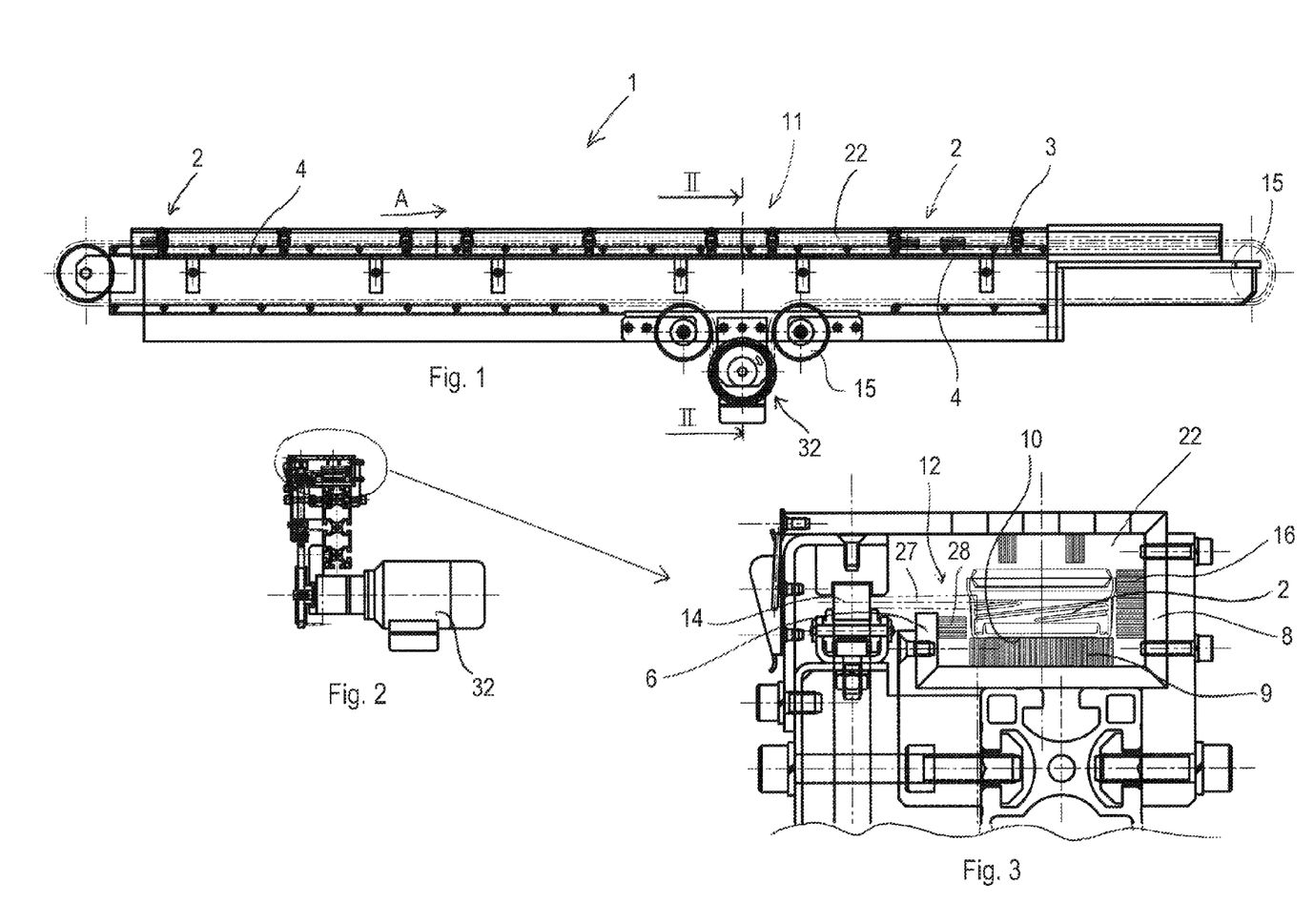
FIG. 1 is a side view of an apparatus for conveying caps.
FIG. 2 is a cross section of the apparatus in FIG. 1 taken along a plane II-II.
FIG. 3 shows an enlarged detail of FIG. 2.
Figure 4:
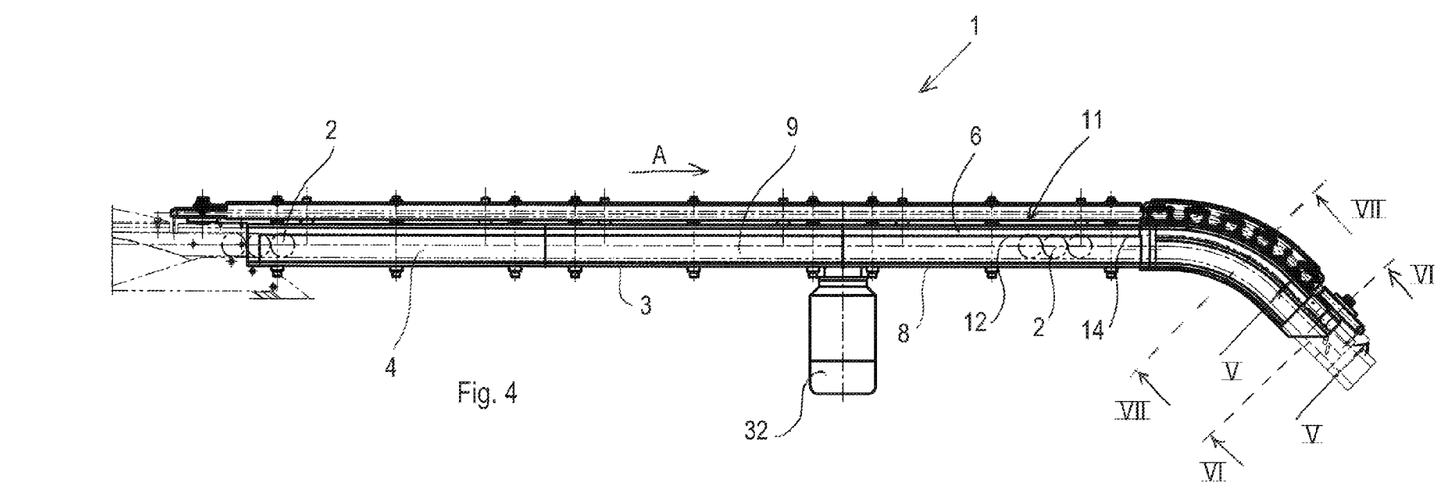
FIG. 4 is a top view of the apparatus in FIG. 1.
Figure 5:
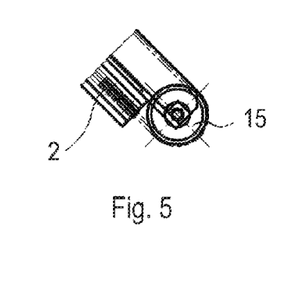
FIG. 5 is a partially sectioned view of a portion of the apparatus in FIG. 4 taken along a plane V-V.
Figures 6, 7, 8:
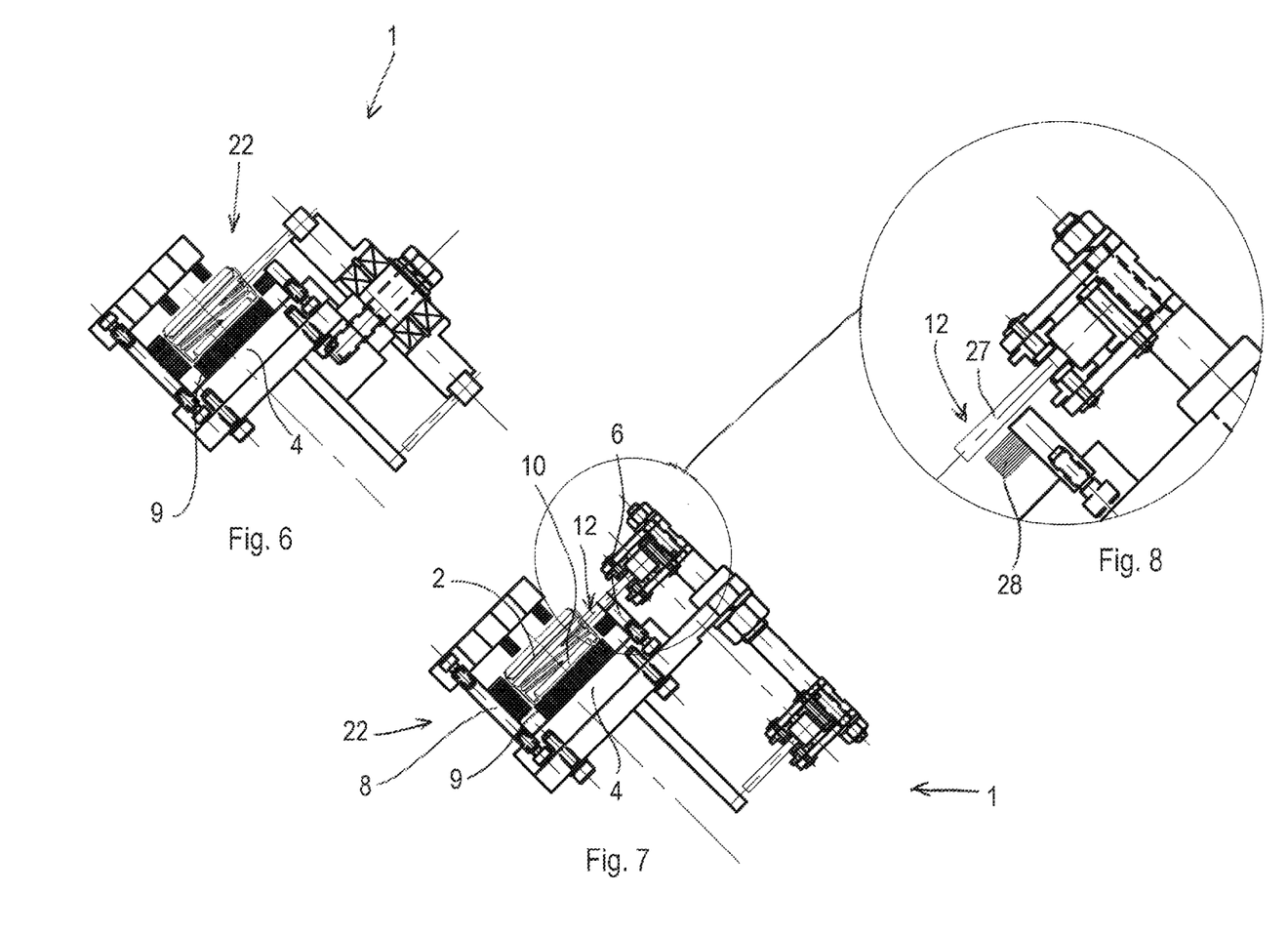
FIG. 6 is a cross section of the apparatus in FIG. 4 taken along a plane VI-VI.
FIG. 7 is another cross section of the apparatus in FIG. 4 taken along a plane VII-VII.
FIG. 8 shows an enlarged detail of FIG. 7.
Figures 9, 10:
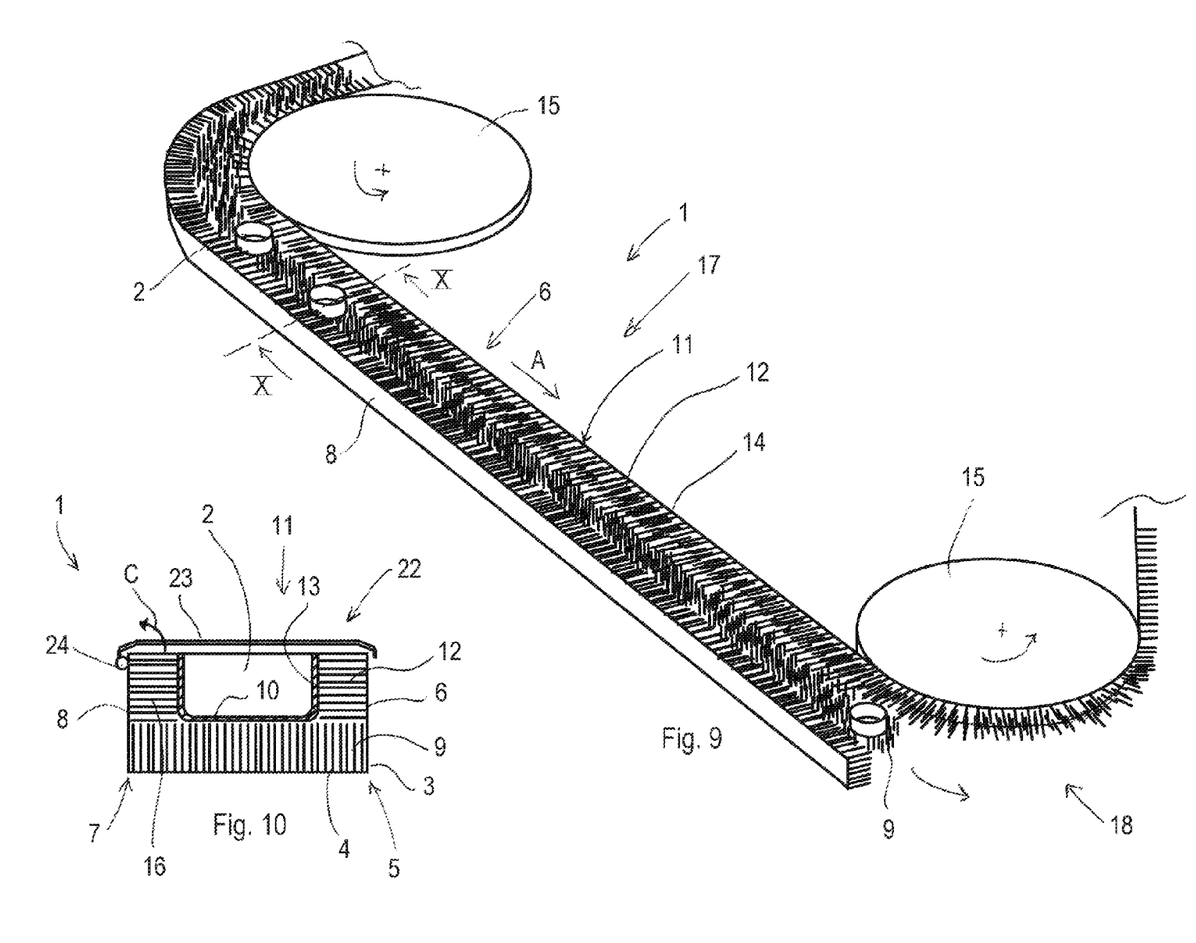
FIG. 9 is a fragmentary and perspective schematic view of an apparatus for conveying objects.
FIG. 10 is a cross section of the apparatus in FIG. 9 taken along a plane X-X.

As better shown in FIGS. 9 and 10, the supporting frame 3 comprises a supporting wall 4, arranged horizontally for supporting the caps 2.

The apparatus 1 comprises an advancing promoting arrangement 11 for promoting a movement of the caps 2 along the advance direction A. The advancing promoting arrangement comprises supporting bristles 9 connected to the supporting wall 4 and arranged substantially orthogonally to the latter. Each cap 2 is positioned on the apparatus 1 so as to result overturned, i.e. so as to have an end wall 10 arranged in contact with the supporting bristles 9, which act as substantially punctiform resting elements for the caps 2.

The supporting bristles 9 support the caps 2 acting on limited zones of the end walls 10, so as to reduce friction generated on the latter.

Near a first edge zone 5 of the supporting wall 4, there is provided a first side guide wall 6 that projects transversely upwards.

From a second edge zone 7 opposite the first edge zone 5, a second side guide wall 8 projects. The advancing promoting arrangement comprises advancing bristles 12 associated with the first guide wall 6.

The advancing bristles 12 are connected to a belt 14 that is movable along the advance direction A and is driven for example through rotatable pulley elements 15 and by means of a motor 32. The belt 14 is driven along a path that may comprise rectilinear zones, and curved zones. For example, FIG. 9 shows a rectilinear zone 17 and a curved zone 18 of a path, along which the caps 2 are moved.

The advancing promoting arrangement comprises guide bristles 16 that are connected to the second guide wall 8 and are arranged substantially horizontally. The guide bristles 16 and the advancing bristles 12 are so configured as to act on limited zones of side walls 13 of the caps 2.

In a version, the advancing promoting arrangement 11 comprises further advancing bristles that are associated with the second guide wall 8, instead of the guide bristles 16.

The further advancing bristles may be connected to a further belt for being moved along the advance direction A in a similar way to what has been disclosed with reference to the advancing bristles 12.

The further advancing bristles enable the caps 2 to be conveyed in a more effective manner.

In a further version of the apparatus, the second guide wall 8 is provided, instead of the guide bristles 16, with roller elements, or with openings through which air is made to flow in the conveying channel 22, so as to limit friction of the caps 2 with the second guide wall 8.

In a still further version, the supporting wall 4 is devoid of the supporting bristles 9. In this case, the advancing bristles 12 and the further advancing bristles are configured for holding therebetween the caps 2 so that the latter do not slide on the supporting wall 4, or at most rest lightly on the latter so as to limit the sliding friction.

The advancing bristles 12 and the guide bristles 16 or the further advancing bristles, are configured and dimensioned so as to prevent the caps 2 from rotating around their own longitudinal axes as they advance. In this way rubbing wear of the caps 2 is prevented and speed of the caps 2 is prevented from being reduced due to rotation thereof about their longitudinal axes.

The apparatus 1 shown in FIG. 10 is provided with a cover 23 that closes from above the conveying channel 22, and that acts for preventing the caps 2 from coming out of the conveying channel 22 and for guiding the caps 2 inside the latter.

The cover 23 has a surface, facing the supporting wall 4, that is smooth in order to reduce friction in case of contact with the caps 2.

The cover 23, having for example a constant thickness, can be made of metal plate, plastics or other material, and is rotatably connected to the supporting frame 3 through a hinge 24. The cover 23 can be rotated in an opening direction C for making the conveying channel 22 accessible for possible inspections.

Figure 11:
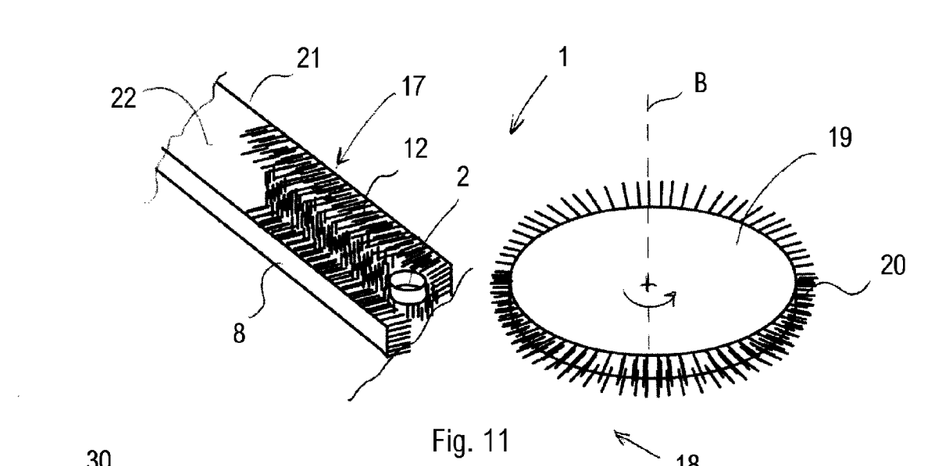
FIG. 11 is a fragmentary and schematic view of an embodiment of the apparatus for conveying objects.

In a version of the apparatus 1 shown in FIG. 11, the advancing promoting arrangement 11 comprises a still further belt 21, drivable by the motor 32, provided with advancing bristles 12 that affect substantially only the rectilinear zone 17 an not the curved zone 18.

The advancing promoting arrangement 11 comprises, near the curved zone 18, an advancing disc 19, positioned instead of the pulley element 15.

The advancing disc 19 is peripherally provided with radial bristles 20 that as rotate about to a rotation axis B interact with the caps 2 making the latter advance along the curved zone 18.

It is possible to provide an advancing disc 19 for one or several curved zones with which the apparatus 1 may be provided. The advancing disc 19 enables an optimal arrangement of the bristles to be kept, either in the rectilinear zones and in the curved zones along which the caps 2 travel, thus preventing variation of the relative positions of the bristles with respect to one another due to bending of the belt at the curved zones.

Figure 12:
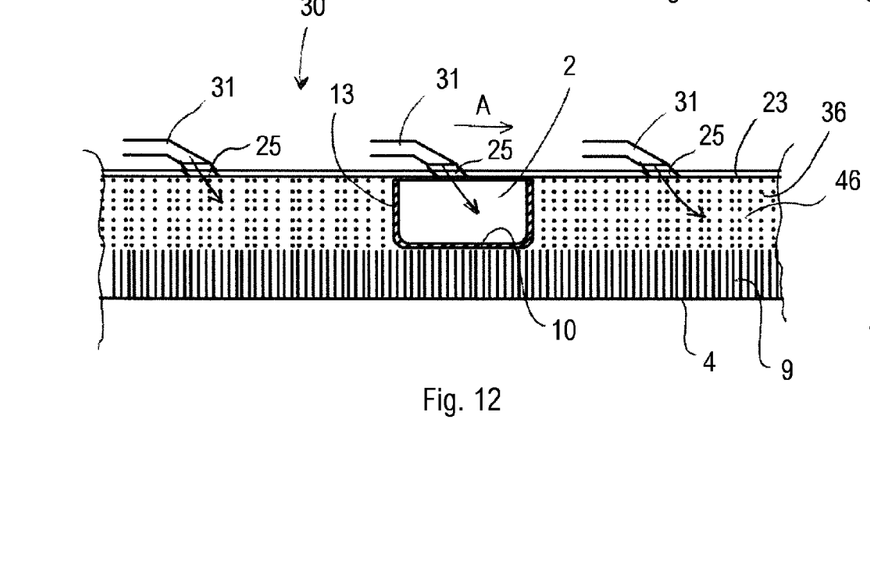
FIG. 12 is schematic longitudinal view of a further embodiment of the apparatus.
Figure 13:
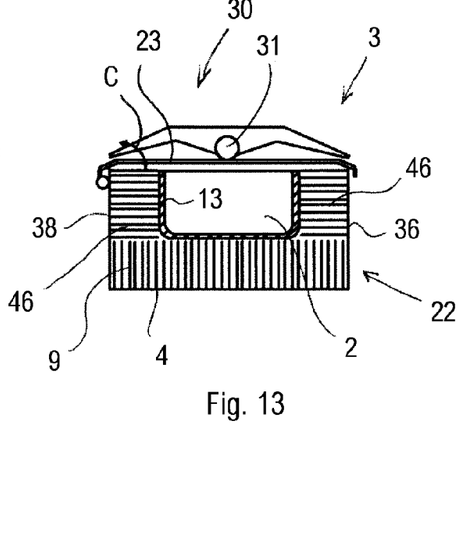
FIG. 13 is a schematic cross section of the apparatus in FIG. 12.

In a version of the apparatus 1, the supporting bristles 9 may be connected to a supporting belt that is movable in the advance direction A similarly to the belt 14. FIGS. 12 and 13 show an apparatus 30 for conveying caps 2 having some parts that are similar to the ones of the apparatus 1 previously disclosed, for which the same reference numbers are used, but that differs from the apparatus 1 as will be disclosed in the following.

The apparatus 30 comprises a supporting frame 3 having a supporting wall 4 provided with supporting bristles 9. The supporting wall 4 is laterally delimited by a further first guide wall 36 and by a further second guide wall 38.

The further first guide wall 36 and the further second guide wall 38 are fixed.

The apparatus 30 is provided with advancing promoting arrangement comprising further guide bristles 46 that are connected to the further first guide wall 36 and to the further second guide wall 38 and that are suitable for interacting with the side walls 13 of the caps 2 for guiding the latter in the advance direction A.

The apparatus 30 in FIGS. 12 and 13 is provided with a cover 23, configured similarly to what has been disclosed with reference to FIG. 10.

The advancing promoting arrangement further comprises blowing nozzles 31. The blowing nozzles 31 are provided above the supporting frame 3 and on the cover 23. The blowing nozzles 31 are suitably spaced from one another and are configured for directing air flows to the caps 2 so as to promote advancing thereof along the advance direction A.

Figure 15:
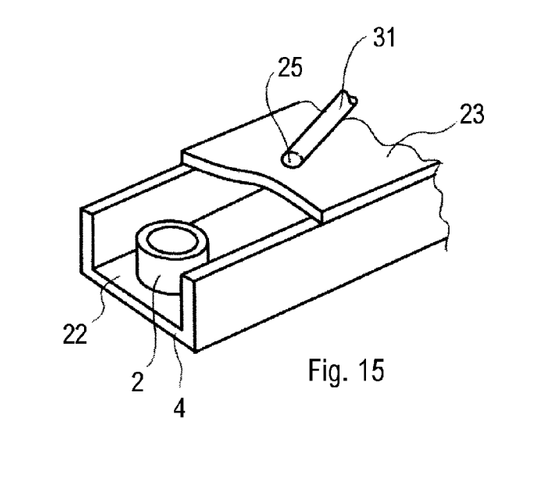
FIG. 15 is a perspective schematic view of a still further embodiment of the apparatus.

Inlet openings 25 are obtained on the cover 23, through which the air flows coming from the blowing nozzles 31 flow into the conveying channel 22, as shown in FIG. 15.

Figure 16:
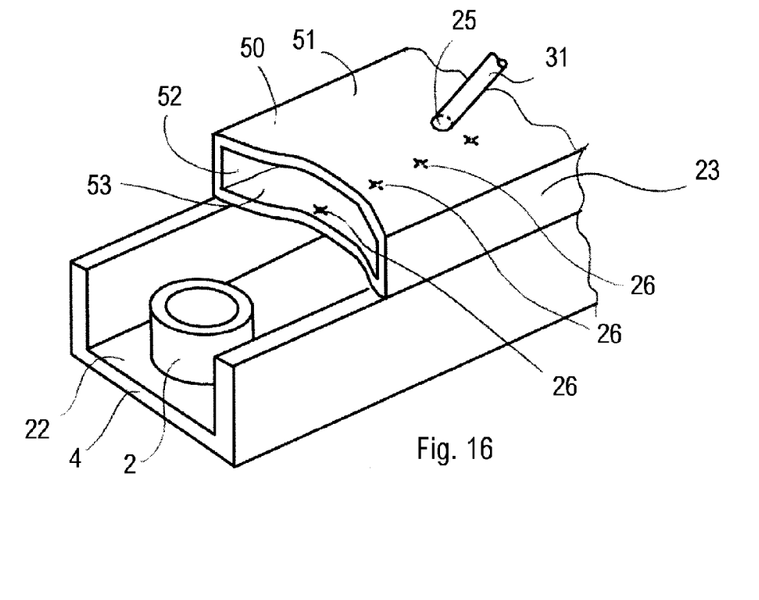
FIG. 16 is a perspective schematic view of a still further embodiment of the apparatus for conveying objects.

In a version, shown in FIG. 16, the cover 23 may comprise a box element 50 defining an air duct 52.

The box element 50 comprises an upper wall 51, to which nozzles 31 are connected for conveying air into the air duct 52.

The box element 50 comprises a lower wall 53, arranged parallel to the upper wall 51, along which outlet openings 26 are obtained.

The outlet openings 26 are distributed along the conveying channel 22 and are shaped for directing the air, introduced inside the air duct 52 by the nozzles 31, to the caps 2 so as to promote advancing thereof.

The supporting bristles 9 and the further guide bristles 46 considerably reduce friction that the caps 2 incur during advancing, thus enabling the air pressure supplied by the blowing nozzles 31 to be reduced.

In this way, the apparatus 30 does not require complicated and expensive devices for compressing the air, and is also less noisy during operation.

In the apparatuses previously disclosed with reference to FIG. 1 to 11, the advancing promoting arrangement may comprise, as well as the advancing bristles 12, blowing nozzles shaped analogously to what has been disclosed for the apparatus 30 with reference to FIGS. 12 e 13. In this case, a combined action of the advancing bristles 12 and of the air supplied by the blowing nozzles is generated that make conveying of the caps 2 more effective.

In this case, the air supplied by the blowing nozzles may have a reduced pressure inasmuch as the caps 2 are moved in the advance direction A partly owing also to the advancing bristles 12.

Figure 14:
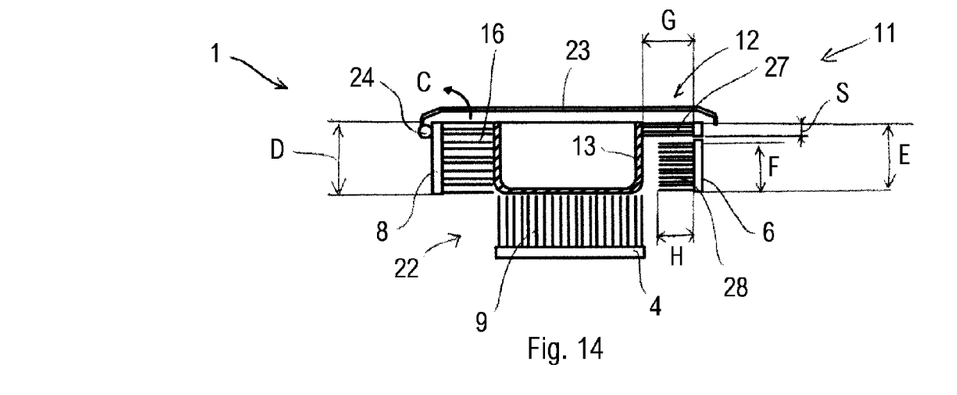
FIG. 14 is a further schematic cross section of an apparatus for conveying objects.

In a version of the apparatus 1 shown in FIG. 14, the second guide wall 8 has a first dimension D, measured perpendicularly to the supporting wall 4, that is greater than, or equal to a height E of the cap 2.

The advancing bristles 12 comprise a group of bristles 27 that are movable, positioned in the proximity of a zone above the first guide wall 6, the latter being fixed.

The bristles group 27 extends, in an orthogonal direction to the supporting wall 4, by a quantity S that is less than the height E.

Furthermore, the group of bristles 27 extends so as to define a third dimension G, measured substantially parallel to the supporting wall 4.

The group of bristles 27 that are movable interact with the side walls 13 of the caps 2. The advancing promoting arrangement 11 further comprise side containing bristles 28, connected to the first guide wall 6, and having the function of containing and guiding the caps 2 inside the conveying channel 22.

The side containing bristles 28 extend on a region of the first guide wall 6 having a second dimension F, measured perpendicularly to the supporting wall 4, that is less than the height E of the cap 2. Furthermore, the containing bristles 28 extend so as to have a fourth dimension H, measured substantially parallel to the supporting wall 4, that is less than the third dimension G. In this way the contact of the containing bristles 28 with the side walls 13 of the caps 2 is reduced as much as possible.

In a version of the apparatus 1, in addition to the group of bristles 27, the first guide wall 6 and the containing bristles 28 can also be movable.

In a further version, the guide bristles 16 and/or the supporting bristles 9 can be movable as well.

Figures 17, 18, 19:
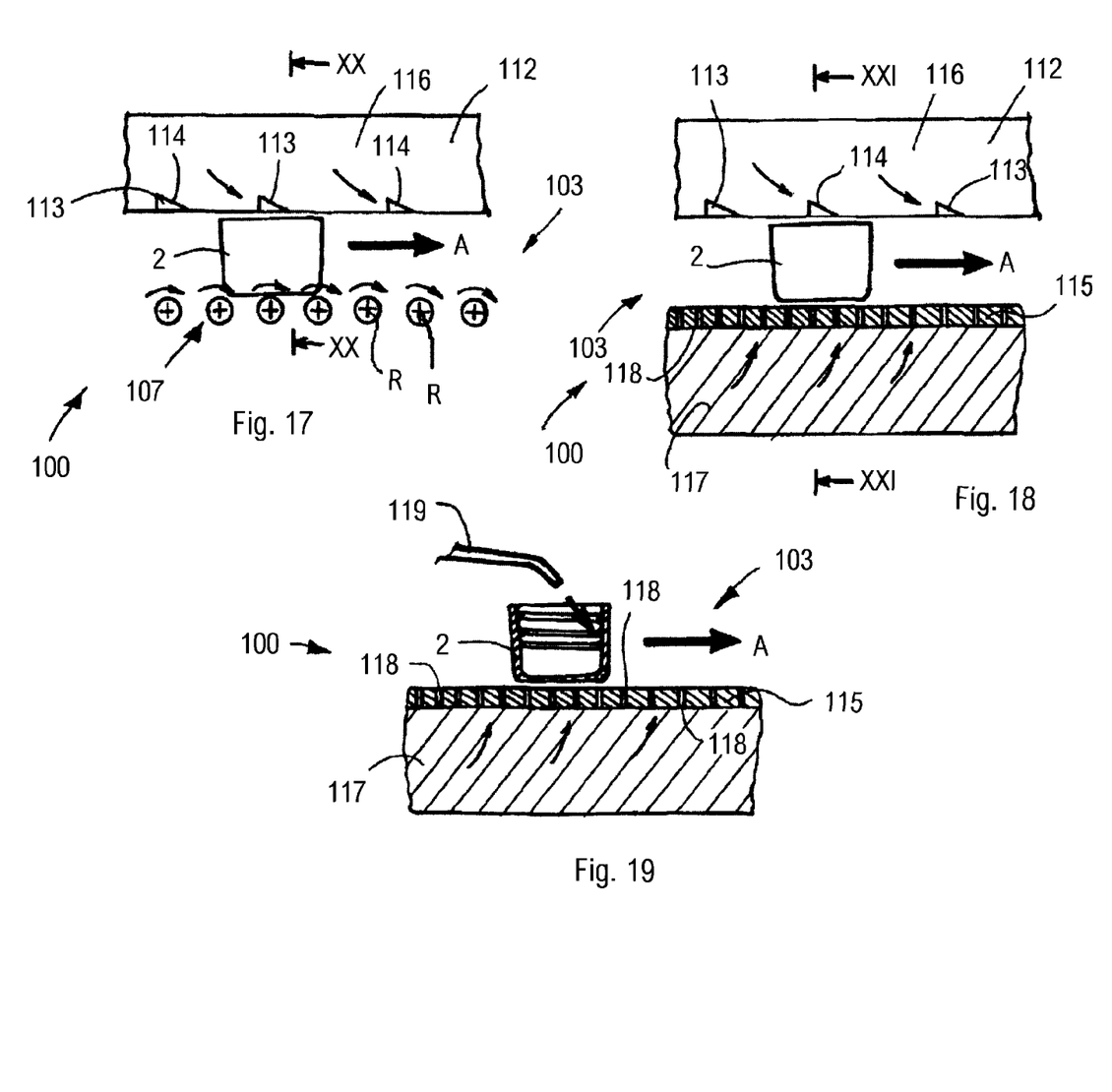
FIG. 17 is a longitudinal section of a still further embodiment of an apparatus for conveying objects.
FIG. 18 is a longitudinal section of a still further embodiment of an apparatus for conveying objects.
FIG. 19 is a longitudinal section of a still further embodiment of an apparatus for conveying objects.
Figure 20:
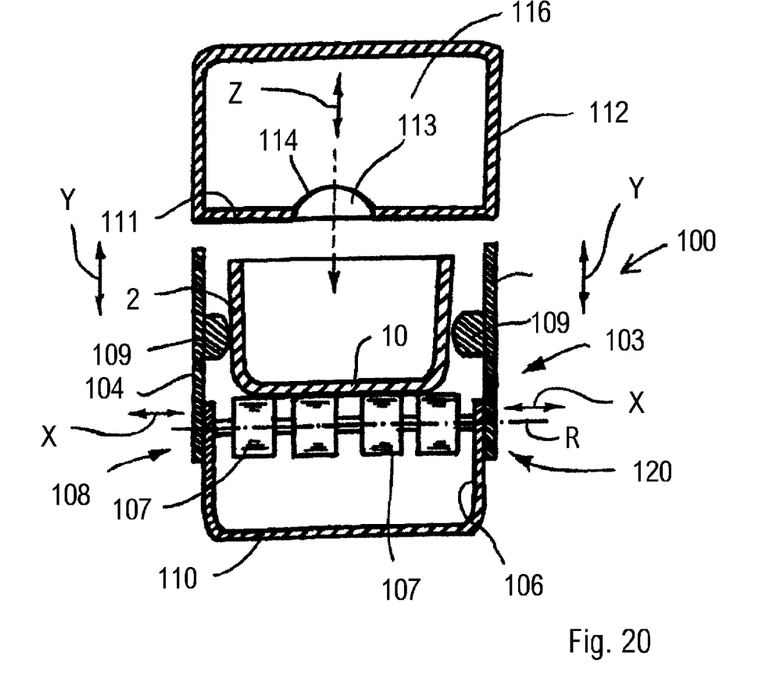
FIG. 20 is a section taken along a plane XX-XX in FIG. 17.

FIGS. 17 and 20 show an embodiment of apparatus 100 for conveying caps 2, comprising a channel element 103 that extends in an advance direction A along which the caps 2 are advanced.

The channel element 103 comprises a first side wall 104 and a second side wall 105 facing one another. The first side wall 104 and the second side wall 105 are provided with guide elements 109 arranged for laterally guiding the caps 2 in the advance direction A. A connecting element 106, for example a U-shaped wall, connects the first side wall 104 to the second side wall 105. The connecting element 106 is interposed between an edge portion 108 of the first side wall 104 and a further edge portion 120 of the second side wall 105 so as to define a bottom part of the channel element 103.

The connecting element 106 comprises a transverse portion 110 that is arranged transversely with respect to the first side wall 104 and to the second side wall 105. A plurality of groups of roller elements 107, for example idle roller elements, is arranged inside the channel element 103, defining a conveying plane for the caps 2. The groups of roller elements 107 support the caps 2 during advancing. The groups of roller elements 107 are positioned between the guide elements 109 and the transverse portion 110.

Each roller element of a group of roller elements 107 is rotatable around an axis R that is arranged transversely to the advance direction A. Furthermore, the axis R is arranged transversely, and substantially perpendicularly, with respect to the first side wall 104 and the second side wall 105.

The groups of roller elements 107 are distributed along the channel element 103, in the advance direction A, to reduce friction that is generated when the caps 2 are conveyed. In this way, the caps 2, that are overturned, i.e. with an end wall 10 thereof interacting with the groups of roller elements 107, can advance fluently in the advance direction A.

The channel element 103 is so shaped that the caps 2 are advanced to form a single row.

The apparatus 100 comprises a blowing element 112, shaped as a hollow box, which is positioned in a zone opposite the groups of roller elements 107 with respect to the guide elements 109.

The blowing element 112 is shaped so as to define a conduit 116 in which an air flow flows.

The air flow may be generated by a fan and, therefore, is not pressurized.

The blowing element 112 comprises a further transverse portion 111 arranged parallel to the transverse portion 110 that faces the groups of roller elements 107. On the further transverse portion 111, a plurality of blowing openings 113 is obtained, through which the air flow comes out from the blowing element 112 to enter the channel element 103.

The blowing openings 113 may be uniformly distributed on the further transverse portion 111 in the advance direction A.

A deflecting portion 114 is associated with each blowing opening 113 to direct part of the air flow to the exterior of the blowing element 112. Each deflecting portion 114 protrudes inside the blowing element 112 in such a way as to direct the air flow towards the interior of the caps 2 and substantially in the advance direction A. In this way the caps 2 are pushed by the air flow in the advance direction A.

The blowing openings 113 may have the shape of a triangle, a vertex of the triangle pointing in the advance direction A.

In a variant, a moving device—not shown—is provided which moves the first side wall 104 and the second side wall 105 with respect to each other transversely to the advance direction A, as shown by the arrows X in FIG. 20, to adjust the width of the channel element 103 so that the channel element 103 may receive caps 2 having different diameters.

In a variant, a transferring device—not shown—moves the first side wall 104 and the second side wall 105 with respect to the conveying plane, as shown by the arrows Y in FIG. 20, and a further transferring device—not shown—moves the blowing element 112 with respect to the conveying plane, as shown by the arrow Z in FIG. 20.

The transferring device and the further transferring device adjust the height of the channel element 103 so that the channel element 103 may receive caps 2 having different heights.

The further transferring device also allows the distance between the blowing opening 113 and the conveying plane to be adjusted in order to properly direct the air flow towards the caps 2.

Figure 21:
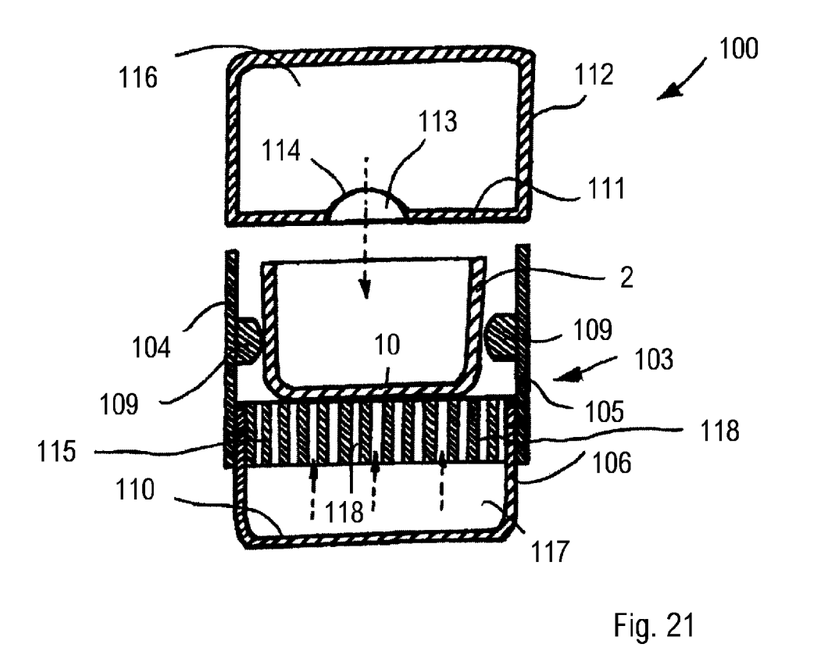
FIG. 21 is a section taken along a plane XXI-XXI in FIG. 18.

FIGS. 18 and 21 show a further embodiment of the apparatus 100 which differs from the embodiment shown in FIGS. 17 and 20 in that it comprises, instead of the groups of roller elements 107, a supporting element 115 for supporting the caps 2.

The supporting element 115 is arranged parallel to the transverse portion 110 and the further transverse portion 111 and extends between the first side wall 104 and the second side wall 105. A further conduit 117 is defined by the supporting element 115 together with the connecting element 106. A further air flow is made to flow within the further conduit 117, for example by means of a fan. The supporting element 115 is provided with a plurality of further openings 118, for example micro-holes, extending through the thickness of the supporting element 115. The further openings 118 are so shaped and so positioned as to define a porous structure arranged for directing the further air flow, coming from the further conduit 117, towards the caps 2. In this way, a fluid bearing or an air cushion is generated on the supporting element 115 that occupies substantially the whole top side of the supporting element 115, thus effectively pushing upwards the caps 2 and reducing friction between the caps 2 and the supporting element 115. This enables the air flow coming from the blowing element 112 to easily push the caps 2 in the advance direction A.

The fluid bearing or air cushion cooperates with the supporting element 115 to define a conveying plane on which the caps 2 are advanced.

Owing to the groups of roller elements 107 and to the supporting element 115 that ensure the effective advancing of the caps 2, it is not necessary to use pressurized air in order to push the caps 2.

Hence, the apparatus 100 disclosed with reference to FIGS. 17, 18, 20 and 21 has simpler structure and reduced power consumption with respect to the prior art apparatuses, since complicated and expensive devices for compressing air, such as compressor devices, are not required. Therefore, the above-disclosed apparatus is more economical than the prior art apparatuses.

Furthermore, the apparatus 100 reduces the noise that in prior art apparatuses is generated by the devices that supply and deliver pressurized air, thus improving the working conditions of operators that work near the apparatus 100.

FIG. 19 shows a still further embodiment of the apparatus 100 comprising nozzle elements 119 that are arranged above the channel element 103 and are oriented as to direct pressurized air towards the caps 2 in order to push the caps 2 in the advance direction A.

The nozzle elements 119 may be reciprocally spaced by a certain distance, thus ensuring that the caps 2 are uniformly and effectively pushed in the advance direction A.

The channel element 103 is provided with a supporting element 115 like the one disclosed with reference to FIGS. 18 and 21.

In a further embodiment, not shown, the nozzle elements 119 may be associated with groups of roller elements 107 similarly to the embodiment of the apparatus 100 shown in FIGS. 17 and 19.

The invention claimed is:

1. Apparatus comprising a conveying element arranged for conveying objects having an end wall, an advancing promoting arrangement for promoting a movement of said objects along said conveying element, said advancing promoting arrangement comprising a bristle arrangement arranged along said conveying element and suitable for interacting with said objects, wherein said bristle arrangement comprises an advancing bristle arrangement that is movable along said conveying element for advancing said objects, wherein said bristle arrangement defines a passage zone along which said objects are advanced, wherein said advancing bristle arrangement comprises a side advancing bristle arrangement that is movable along a side region of said passage zone for interacting with a side surface of said objects, wherein said conveying element comprises a conveying plane element on which said objects are advanced, said end wall of said objects resting on said conveying plane element when said objects are advanced.

2. Apparatus according to claim 1, wherein said side advancing bristle arrangement comprises at least a group of bristles that is configured for interacting with part of said side surface.

3. Apparatus according to claim 2, wherein said advancing promoting arrangement comprises a containing bristle arrangement, for guiding said objects, said containing bristle arrangement being arranged in said side region and having a length that is less than a further length of said at least a group of bristles.

4. Apparatus according to claim 1, wherein said side advancing bristle arrangement is supported by a belt element drivable through a pulley arrangement.

5. Apparatus according to claim 1, wherein said bristle arrangement comprises a guide bristle arrangement arranged along a further side region of said passage zone opposite to said side region, for interacting with said side surface.

6. Apparatus according to claim 1, wherein said advancing bristle arrangement comprises a further side advancing bristle arrangement that is movable along a further side region of said passage zone opposite to said side region, for interacting with said side surface.

7. Apparatus according to claim 6, wherein said further side advancing bristle arrangement is supported by a further belt element drivable through a further pulley arrangement.

8. Apparatus according to claim 1, wherein said bristle arrangement is arranged substantially transversely to an advance direction for said objects.

9. Apparatus according to claim 1, wherein said conveying plane element comprises a supporting bristle arrangement arranged on said conveying plane element for interacting with said end wall of said objects.

10. Apparatus according to claim 9, wherein said supporting bristle arrangement is arranged substantially transversely to said conveying plane element.

11. Apparatus according to claim 9, wherein said supporting bristle arrangement is movable along said conveying plane element for conveying said objects.

12. Apparatus according to claim 1, wherein said bristle arrangement comprises a circular bristle arrangement rotatable about rotation axes for advancing said objects along curved path zones.

13. Apparatus according to claim 12, wherein said circular bristle arrangement comprises a disc arrangement peripherally provided with a bristle arrangement that is radially arranged.

14. Apparatus according to claim 1, wherein said advancing promoting arrangement further comprises a nozzle arrangement suitable for directing air towards said objects.

15. Apparatus according to claim 14, wherein said nozzle arrangement comprises nozzles distributed along said conveying element.

16. Apparatus according to claim 1, and further comprising a cover element arranged for closing said conveying element.

17. Apparatus according to claim 16, wherein said cover element is rotatably connected to said conveying element for enabling access into said conveying element.

18. Apparatus according to claim 16, wherein said cover element is provided with a substantially smooth surface intended to face the inside of said conveying element.

19. Apparatus according to claim 16, wherein said advancing promoting arrangement further comprises a nozzle arrangement suitable for directing air towards said objects and inlet openings are obtained on said cover element for enabling said nozzle arrangement to send air into said conveying element.

20. Apparatus according to claim 16, wherein said advancing promoting arrangement further comprises a nozzle arrangement suitable for directing air towards said objects and said cover element comprises a box element defining a duct for receiving air from said nozzle arrangement.

21. Apparatus according to claim 20, wherein said nozzle arrangement comprises nozzles distributed along said conveying element and said box element comprises a first wall, connected to said nozzles, and a second wall parallel to said first wall and provided with outlet openings arranged for directing said air into said conveying element.

22. Apparatus according to claim 1, wherein said objects are caps.

* * * * *